C. S. STANWORTH.
SPEED FINDER FOR MOVING BODIES.
APPLICATION FILED MAY 8, 1912.
1,047,584.                                Patented Dec. 17, 1912.
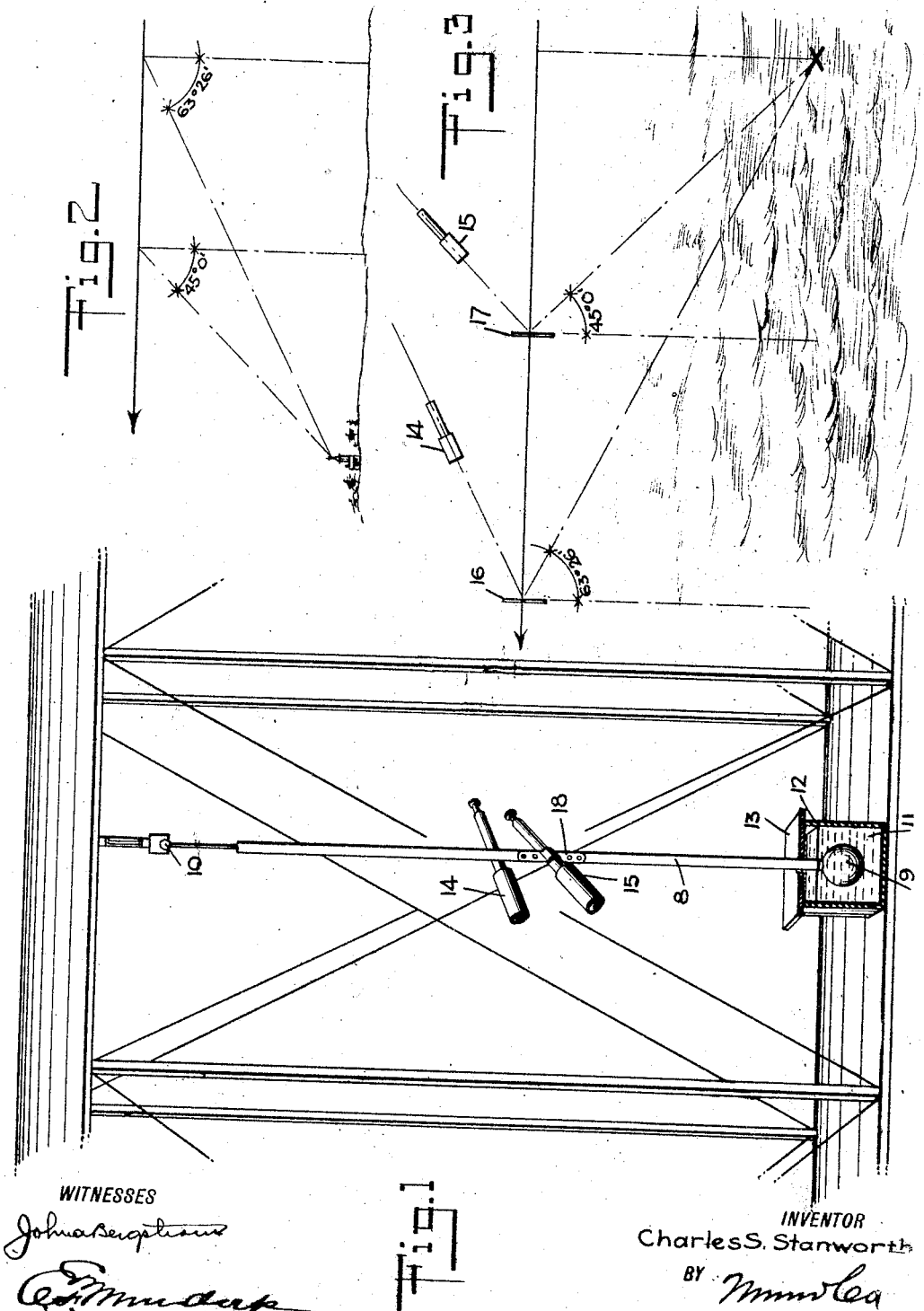
WITNESSES                                 INVENTOR
                                          Charles S. Stanworth
                                          BY
                                          ATTORNEYS

UNITED STATES PATENT OFFICE.

CHARLES SEMMES STANWORTH, OF NORFOLK, VIRGINIA.

SPEED-FINDER FOR MOVING BODIES.

1,047,584.  Specification of Letters Patent.  Patented Dec. 17, 1912.

Application filed May 8, 1912. Serial No. 695,863.

*To all whom it may concern:*

Be it known that I, CHARLES S. STANWORTH, a citizen of the United States, and a resident of Norfolk, in the county of Norfolk and State of Virginia, have invented a new and Improved Speed-Finder for Moving Bodies, of which the following is a full, clear, and exact description.

Among the principal objects which the present invention has in view are: to provide means carried by a moving body, for ascertaining the speed of travel relative to a fixed object; and to provide an instrument of the character mentioned which does not necessitate elaborate or complicated relation or calculation based upon the findings provided by the instrument.

Reference is to be had to the accompanying drawings forming a part of this specification, in which similar characters of reference indicate corresponding parts in all the views, and in which—

Figure 1 is a pictorial view of a fragment of an aeroplane, showing applied thereto a speed-finder constructed and arranged in accordance with the present invention; Fig. 2 is a diagrammatic view showing the geometric figure upon which the calculations are based; and Fig. 3 is a diagrammatic view illustrating the method of applying the instrument in use, such as ascertaining the speed of a vessel at sea and out of sight of land.

The instrument, as seen in Fig. 1 of the drawings, primarily consists of a flat band or bar 8, at the lower end of which is fixedly mounted a heavy plumb bob or weight 9. The bar 8 is hung by a universal joint 10 upon the structure of the machine or vehicle to which the instrument is applied. The joint thus formed is flexible, as little resistance as possible being offered to the free swing, in all directions, of the bar 8.

To avoid or check minor and unimportant vibration of the bar 8, the bob 9 is immersed in glycerin 11 or other suitable material, which is maintained in a box or receptacle 12. To prevent the splashing of the material 11 from the box 12, a free-moving cover 13 is mounted on the box, which serves to prevent the splashing of the liquid from the box 12. This method of suspending the bar 8 secures as positive a base for calculations as can be obtained, the extension of the bar 8 being accurately perpendicular to the surface of the earth, and this whether the instrument be mounted upon an aeroplane, dirigible balloon, or sea-going vessel.

Fixedly mounted upon the bar 8 are two telescopes 14 and 15, each being secured to the bar 8 by straps 18, bolted or riveted in position upon the bar 8. The mounting of the telescopes is sufficiently rigid to prevent the relative displacement thereof. The telescopes may be of any suitable and approved construction, those preferred by me being such as are provided with cross wires or two sight vanes, to enable the operator to more accurately judge the instant of alinement of the telescope.

The telescopes 14 and 15 are placed each fixedly relative to the bar 8, and the axis of each of said telescopes being disposed at an angle to said bar different from the angle between said bar and the other of said telescopes. These angles are variable to suit the convenience or design of the constructor. When once set, they remain thereafter fixed, and a table is worked out from the set of the angles, which, in the employment thereof, furnishes the desired information.

I prefer the telescopes 14 and 15 to be set at an angle to the bar 8 of 63°:26′, and 45°, respectively.

With an instrument constructed and arranged as above described, the operation is as follows:—When the instrument is applied, as shown in the accompanying drawings, to an air-ship, the aviator, desiring to ascertain the speed at which he is traveling, marks with the naked eye an object on the earth's surface toward which he is moving. He, by means of the telescope 14, first sights the object, and notes the time at which the cross wires or vanes on the telescope pass some particular spot on the object. Transferring then his eye to the telescope 15, he waits until the cross wires on the second telescope pass the same spot upon which observation was previously taken. Noting the elapsed time, he turns to a table worked out with reference to the various heights at which he may fly, from which table the result may be quickly and accurately ascertained. Thus with the telescopes so set, a table, of which a short sample is herein inclosed, may be employed.

| Elapsed time between bearings. | | Height in feet. | | | | | |
|---|---|---|---|---|---|---|---|
| | | 500 | 1,000 | 1,500 | 2,000 | 2,500 | 3,000 |
| Min. | Sec. | Speed in statute miles. | | | | | |
| | 1 | 34 | 68 | 102 | | | |
| | 15 | 23 | 45 | 68 | 91 | 113 | |
| | 20 | 17 | 34 | 51 | 68 | 85 | 102 |
| | 25 | 14 | 27 | 41 | 54 | 68 | 82 |
| | 30 | 11 | 23 | 34 | 45 | 57 | 68 |
| | 35 | | 19 | 29 | 39 | 49 | 58 |
| | 40 | | 17 | 25 | 34 | 42 | 51 |
| | 45 | | 15 | 23 | 30 | 38 | 45 |
| | 50 | | 14 | 20 | 27 | 34 | 41 |
| | 55 | | 12 | 19 | 25 | 31 | 37 |
| 1 | 00 | | 11 | 17 | 23 | 29 | 34 |

From the above, it will be seen that if the aviator knows he is flying at a height of 1,000 feet, and he has an elapsed time of 45 seconds, by reference to the table, he will see that he is traveling at the rate of fifteen miles an hour. If the elapsed time is fifteen seconds, he will know that he is traveling at the rate of forty-five miles an hour. This knowledge is particularly desirable in what may be termed air-ships used in military operations, where it is desired to drop an explosive from an air-ship when flying at a high rate of speed. Thus, if traveling at the rate of sixty-eight miles an hour and the explosive be let go, a trajectory is formed equal to the initial speed and the height from which the falling object is started. With some little experience, the aviator knowing the rate of speed at which he is traveling, may with great accuracy drop an object to strike within a given area.

As shown in Fig. 3, a finder of this construction is employed for ascertaining the speed of an aeroplane at sea when the same is out of sight of land or other known fixed object.

In conjunction with the telescopes above described, it has been found desirable to employ two parallel horizontally-alined mirrors 16 and 17. The mirrors 16 and 17 are disposed relative to the telescopes 14 and 15, and are preferably disposed perpendicular to the flight of the aeroplane, and facing rearwardly therefrom.

An object, such as oil slick or calcium phosphid, may be delivered from the aeroplane upon the surface of the sea to be thereafter observed in the mirrors as the image thereof crosses the same. The calculation and consultation of the table above given are followed here in the same manner as above noted, with the single exception that the first observation is taken with the telescope 15, and the second observation is taken with the telescope 14, or in other words, the first observation is taken with the telescope set at 45° from the nadir, and the second observation is taken with the telescope set at 63° :26′ from the nadir. The elapsed times will give the same results as in the former calculations.

Having thus described my invention, I claim as new and desire to secure by Letters Patent:—

1. A speed-finder, comprising a vertical support; and a plurality of sighting devices rigidly mounted thereon at different angles thereto.

2. A speed finder, comprising a plurality of rigidly mounted sighting devices rigidly set at different angles to the nadir.

3. A speed-finder, comprising a plurality of sighting devices rigidly mounted in juxtaposed relation and fixedly set at different and correlated angles to the nadir.

4. A speed-finder, comprising a plurality of sighting devices rigidly mounted in juxtaposed relation and fixedly set at different and correlated angles to the nadir; and means for maintaining the axis of the mounting of said devices parallel to the nadir.

5. A speed-finder, comprising a plumbed support; and a plurality of sighting devices mounted on said support in juxtaposed relation in parallel planes and at different and correlated angles to said plumbed support.

6. A speed-finder, comprising a plumbed support; a plurality of sighting devices mounted on said support in juxtaposed relation in parallel planes and at different and correlated angles to said plumbed support; and means for checking inherent vibration in said plumbed support.

7. A speed finder, comprising a pendulum; and a plurality of telescopes mounted on said pendulum in parallel planes and disposed at different and correlated angles upon said pendulum.

8. A speed-finder, comprising a pendulum; a plurality of telescopes mounted on said pendulum in parallel planes and disposed at different and correlated angles upon said pendulum; and a liquid bath for the free end of said pendulum to still inherent vibrations in said pendulum.

9. A speed-finder, comprising a plurality of telescopes mounted in parallel planes and set at correlated angles; and a support for said telescopes, to maintain the same in constant relation to the nadir.

10. A speed finder, comprising a plurality of telescopes mounted in parallel planes and set at correlated angles; a support for said telescopes, to maintain the same in constant relation to the nadir; and a plurality of vertically disposed reflectors mounted in the same horizontal plane, each intersecting the axis of one of said telescopes.

11. A speed-finder, comprising a sighting instrument having a plurality of view passages diverged at a known angle, said axes being disposed in parallel vertical planes; and means for maintaining constant the relation of said instrument to the horizontal plane.

In testimony whereof I have signed my name to this specification in the presence of two subscribing witnesses.

CHARLES SEMMES STANWORTH.

Witnesses:
P. C. STANWORTH,
CORA LEE LUM.